United States Patent [19]

Ueno

[11] Patent Number: 4,564,301

[45] Date of Patent: Jan. 14, 1986

[54] TYPEWRITER WITH TEXT MEMORY

[75] Inventor: Hideo Ueno, Nagoya, Japan

[73] Assignee: Brother Kogyo Kabushiki Kaisha, Nagoya, Japan

[21] Appl. No.: 596,587

[22] Filed: Apr. 4, 1984

[30] Foreign Application Priority Data

Apr. 12, 1983 [JP] Japan ................................ 58-64328

[51] Int. Cl.4 .......................... B41J 5/30; G06K 3/00

[52] U.S. Cl. ........................................ 400/63; 400/61; 364/519

[58] Field of Search ........................ 364/518, 519, 523; 400/61, 313, 314.1, 705.3, 318, 63, 319

[56] References Cited

U.S. PATENT DOCUMENTS

| | | | |
|---|---|---|---|
| 3,439,341 | 4/1969 | Dolby et al. | 364/523 X |
| 3,579,193 | 5/1971 | Bernier | 400/63 X |
| 3,685,629 | 8/1972 | Rott | 400/314.1 X |
| 3,915,278 | 10/1975 | Spence et al. | 400/63 X |
| 3,987,882 | 10/1976 | Kobryn | 400/120 |
| 4,067,430 | 1/1978 | Wienhold | 400/318 |
| 4,381,553 | 4/1983 | Ferguson | 364/519 X |
| 4,388,007 | 6/1983 | Meier et al. | 400/315 |

FOREIGN PATENT DOCUMENTS

| | | | |
|---|---|---|---|
| 0051857 | 5/1982 | European Pat. Off. | 364/518 |
| 2915356 | 10/1980 | Fed. Rep. of Germany | 40/61 |

OTHER PUBLICATIONS

Radio Communication, Cline I., "Automatic CR/LF for VDUS USED in RTTY," vol. 55, No. 12, Dec. 1979, pp. 1137 and 1140.

IBM Tech. Disc. Bulletin, O'Quin et al., "Communication of Mid-Line Keyboard Changes in Communicating Word Processors," vol. 25, No. 10, Mar. 1983, p. 5141.

*Primary Examiner*—William Pieprz

*Assistant Examiner*—James R. McDaniel

*Attorney, Agent, or Firm*—Moonray Kojima

[57] ABSTRACT

Data entered from a keyboard of a typewriter is stored in a text memory, and then, the data stored in the text memory is read out and printed on a paper. In order to fully print the data stored in the text memory, a first printing control means is operated. In order to stop the printing operation at a position which was not intended when the text was created, the printing operation is stopped by a second printing control means every time one line is printed.

7 Claims, 5 Drawing Figures

TYPEWRITER WITH TEXT MEMORY

BACKGROUND OF THE INVENTION

1. Field of Invention

This invention relates to a printing control apparatus for typewriters, and more particularly to a control apparatus which has a text memory and controls operation of a printer, based on data stored in the text memory.

2. Description of Prior Art

Known in the art are typewriters having text memory which can store a large amount of data entered from a keyboard. When data stored in a text memory in such a typewriter is read out and printed, it is sometimes desired to stop the printing operation at a point midway in the text. In such a case, the printing stop command data must be written within the text previously, at the time of text creation. Thus, when printing is performed to a prescribed position, the printing operation may be automatically stopped. For example, addressing or the like may be printed by ordinary typewriting operation and then the automatic printing operation may then again be performed. This arrangement acts well if it is previously known of the necessity to stop the printing operation. However, if stopping of the printing operation is desired after the text is created, it is difficult to stop the printing operation accurately at a desired position, using a conventional typewriter.

SUMMARY OF THE INVENTION

Accordingly, an object of the invention is to improve the prior art, and to overcome disadvantages and deficiencies of the prior art.

In order to stop the printing operation accurately even at a position which was not intended at the time of text creation, a further object is to provide a typewriter which can stop the printing operation after the printing of one line is finished.

Another object is to provide a typewriter wherein data entered from a keyboard is stored in a text memory and the data stored therein is printed by a printer in a different manner.

A further object is to provide a typewriter comprising a first printing control means to perform printing from a prescribed position in a text until detecting the printing stop signal when data stored in the text memory is to be printed by a printer and a second printing control means to stop the printing operation after the printing of one line is finished.

DESCRIPTION OF PREFERRED EMBODIMENTS

Figure 1:
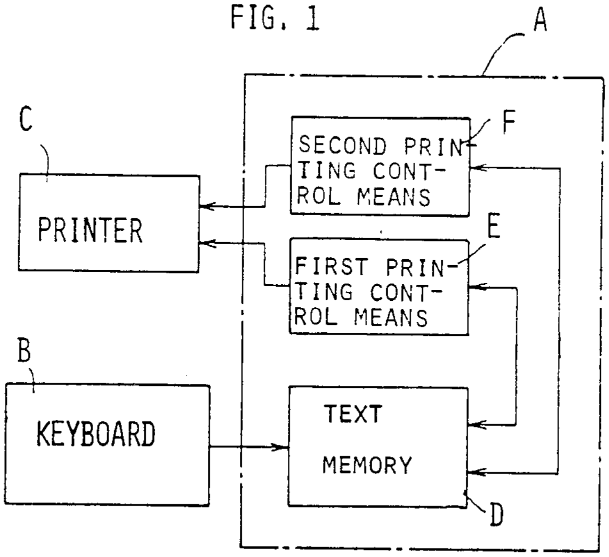
FIG. 1 is a block diagram depicting an illustrative embodiment of the invention.

Referring to FIG. 1, a printing control apparatus embodying the invention is used in a typewriter having a keyboard B and a printer C, and is provided with a text memory D, a first printing control means E and a second printing control means F. Text memory D sequentially stores data entered from keyboard B. First printing control means E reads data stored in text memory D from the beginning of the text until the detection of a printing stop signal, or the end of the text, and makes printer C print the read data. Second printing control means F reads the data stored in text memory D and makes printer C print the data corresponding to one printing line and then stops the printing operation.

Figure 2:
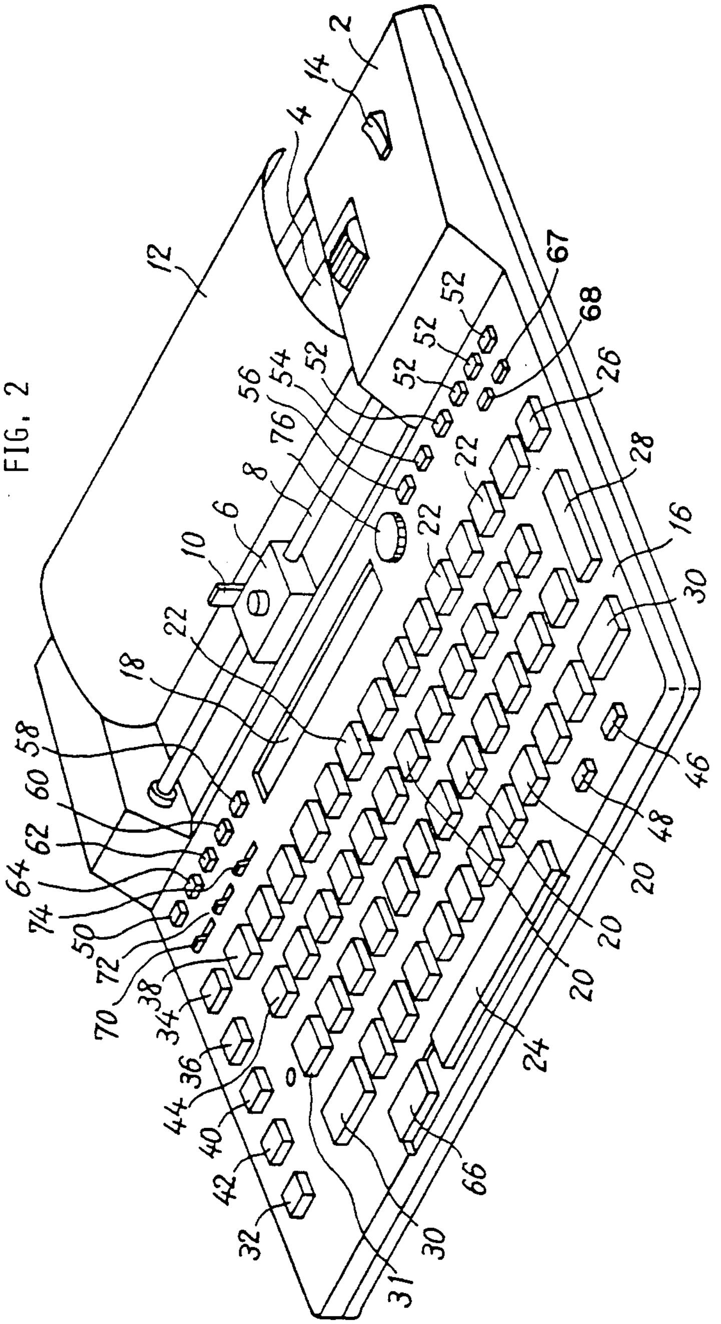
FIG. 2 is a perspective view depicting an electronic typewriter embodying the invention.

FIG. 2 illustrates the exterior of a typewriter embodying the invention. The typewriter comprises a body case 2, a platen 4 rotatably supported by body case 2, and a carriage 6, being movable in parallel to the rotational center line of platen 4. Carriage 6 is guided by a guide rod 8 supported in parallel to platen 4 by body case 2, and is moved in a longitudinal direction of platen 4 by a drive device (not shown). A thermal printing head 10, is fixed to carriage 6, and is movable along a printing line on a thermal sensitive printing paper 12, held on platen 4, when carriage 6 is moved as described above. Carriage 6 is further rotated about guide rod 8 by another drive device (not shown) and this rotation moves head 10 between a print position whereat the head 10 is driven against paper 12 and a separate position whereat it is separated from paper 12. Platen 4 is likewise driven to be rotated by a drive device (not shown) and feeds paper 12 in a direction perpendicular to the printing line. A power supply switch 14 is installed on body case 2.

In the front top surface of body case 2 is provided a keyboard 16 which has a liquid crystal display 18 of 16 columns. On keyboard 16 are further arranged operational members, such as keys, changeover switches, knobs and the like, for operating the typewriter. These operational members are, for example, as listed below.

Alphabetic keys 20 are keys to enter alphabetic characters. Numeric keys 22 are keys to enter numeric characters 1 through 9 and 0. Space bar 24 is a key to advance carriage 6 along the printing line without printing alphabetic or numeric characters. Back space key 26 is a key to erase the least significant digit of characters displayed on display 18. Line feed key 28 is a key to perform line feed operation, that is, the operation of returning carriage 6 to left margin position and rotating platen 4 so as to feed the printing paper in a direction perpendicular to the printing lines by an amount corresponding to one printing line.

Shift key 30 is a key to select capital letter of characters of alphabetic keys 20 or symbols assinged to numeric keys 22. Shift lock key 31 is a key to hold the selecting state of the capital letter or the like. Second shift key 32 is a key which is operated simultaneously with any of alphabetic keys 20 and numeric keys 22 so as to select a special symbol other than the alphabetic or numeric characters or symbols, such as umlaut or accent circumflex. Left margin key 34 is a key to set the left end of the printing line. Right margin key 36 is a key to set the right end of the printing line. Margin release key 38 is a key to release the right margin and left margin positions in one printing line. Tab setting key 40 is a key to set tab position in the printing line set by left margin key 34 and right margin key 36.

Tab clear key 42 is a key to release the position set by tab setting key 40. Tab key 44 is a key to move carriage 6 to the tab position set by tab setting key 40. Paper feed key 46 is a key to feed paper 12, as printing paper, in a direction perpendicular to the printing lines by a prescribed pitch. Paper return key 48 is a key to move paper 12 in a reverse direction the the usual paper feed direction. Repeat key 50 is a key which is operated subsequent to the operation of alphabetic keys 20, numeric keys 22, space bar 24, back space key 26, line feed key 28, paper feed key 46, paper return key 48 or the like, so as to repeat the operation assigned to the respective key.

Arithmetic keys 52 are keys to assign arithmetic operations of addition, subtraction, multiplication, and division. Equal key 54 is a key to command execution of operations assigned by the arithmetic keys. Clear key 56 is a key to erase any of the alphabetic and numeric characters, arithmetic symbols and arithmetic results as well as printing control symbols such as line feed symbol, paper feed symbol, printing stop symbol and the like. Right cursor key 58 is a key to move a cursor displayed on display 18, to the right, i.e. to lower columns. Left cursor key 60 is a key to move the cursor to the left, i.e. to upper columns.

Delete key 62 is a key to delete characters or printing control symbols in the column position corresponding to the cursor moved by cursor keys 58 and 60. Insert key 64 is a key to shift characters or printing control symbols displayed on upper columns with respect to the column position corresponding to the cursor moved by cursor keys 58 and 60 towards upper column side and to add characters or printing control symbols to the column position corresponding to the cursor. Code key 66 is a key which is operated together with any of the above keys so as to generate code data which is different from that generated when such key is solely operated. Stop key 67 is a key operated in order to stop printing when a text is read out from a text memory and printed. Continue key 68 is a key to start printing operation again, after the printing operation is stopped according to the printing stop command data.

Line pitch selecting switch 70 is a three position slide type switch for selecting the feed pitch of paper 12 when the line feed key 28 is operated. Mode selecting key 72 is a three position slide type switch for selecting any of three modes, that is, non-print mode, collection print mode and direct print mode; wherein non-print mode is a mode in which key inputted characters or arithmetic results are displayed in display 18 without printing by head 10; collection print mode is a mode in which each character key inputted is displayed on display 18 and corrected and characters overflowed from display 18 are sequentially printed on paper 12 by head 10; and direct print mode is a mode in which characters inputted by keys are displayed on display 18 and printed on paper 12 by head 10 simultaneously with the inputting.

Text memory switch 74 is a switch to select whether or not a text memory is used. Bright angle setting dial 76 is a dial to adjust the bright angle of display 18.

Figure 3:
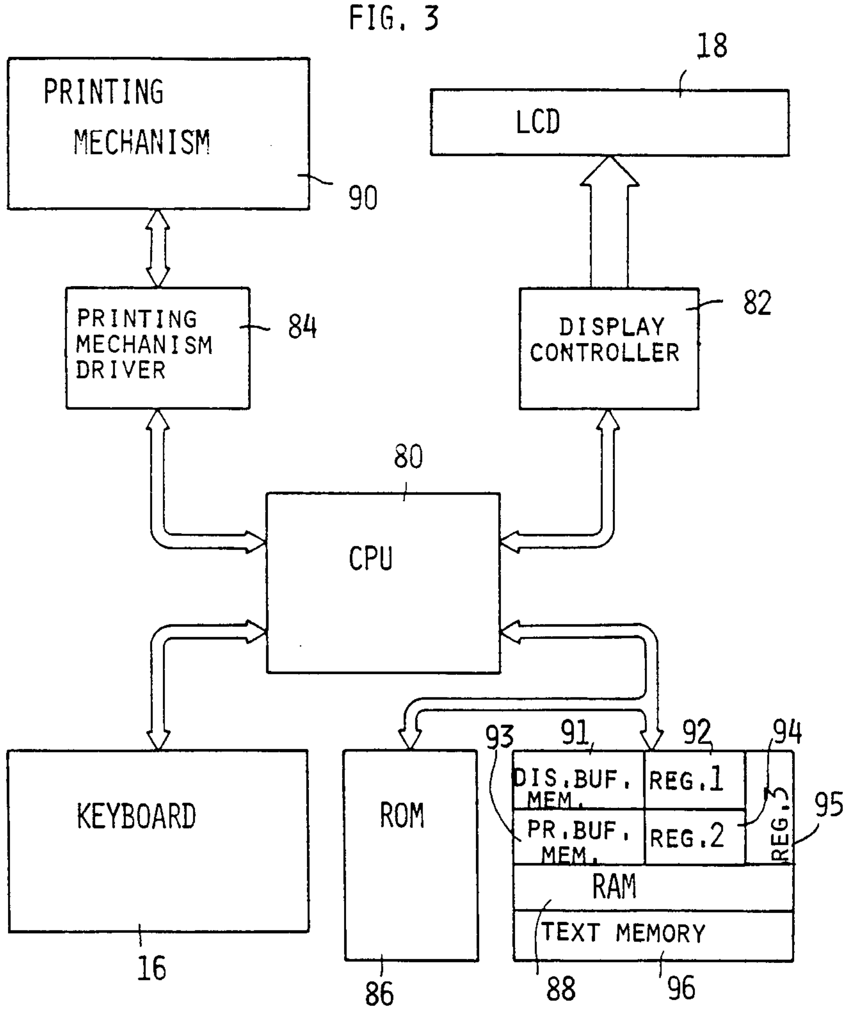
FIG. 3 is a block diagram depicting electronic circuit components of the embodiment.

FIG. 3 depicts a block diagram of electronic circuit components in the illustrative embodiment, and comprises a central processing unit (CPU) 80, to which are connected keyboard 16, display controller 82, printing mechanism driver 84, read only memory (ROM) 86 and a random access memory (RAM) 88. The liquid crystal display 18 is connected to display controller 82 and the two together constitute a display unit. A printing mechanism 90 is connected to printing mechanism driver 84 and the two together constitute a printing unit. The printing mechanism 90 includes platen 4 and carriage 6 and drive devices to drive these, as well as head 10.

RAM 88 is provided with a display buffer memory 91 having the same column number as that of display 18. CPU 80 stores code data to the display buffer memory 91, in sequence, the code corresponding to alphabetic and numeric characters, spaces, arithmetic symbols and other symbols as well as printing control symbols, such as line feed symbol, paper feed symbol and the like, all entered from keyboard 16; and reads out the pattern data corresponding to the code data from ROM 86 and supplies the code data to the display controller 82.

Display controller 82 is provided with a buffer memory having the same column number as that of display buffer memory 91 and makes display 18 indicate characters or printing control symbols based on the pattern data fed from CPU 80. RAM 80 is provided with a printing buffer memory 93 corresponding to 20 characters to store the printing data entered from keyboard 16. Printing mechanism driver 84 drives head 10 of printing mechanism 90 according the the pattern data read out from ROM 86 by CPU 80, based on the data stored in printing buffer memory 93. Printing driver mechanism 84 drives also a motor or the like to drive the carriage 6 and platen 4. A program to control the operation of the typewriter is stored in ROM 86.

RAM 88 is provided with a text memory 96 which can store about 2K bytes of data, which are character data and function data, including printing control data. RAM 88 further comprises a first register 92, a second register 94 and a third register 95. First register 92 stores position of head 10 (distance of head 10 from the original position represented by the number of characters which can be printed). Second register 94 stores value of the count content of first register 92, added by the number of characters, printing control symbols and the like stored in display buffer memory 91. In other words, second register 94 stores the position of the printing head, assuming that characters and the like displayed in display 18, are all printed.

Figure 4:
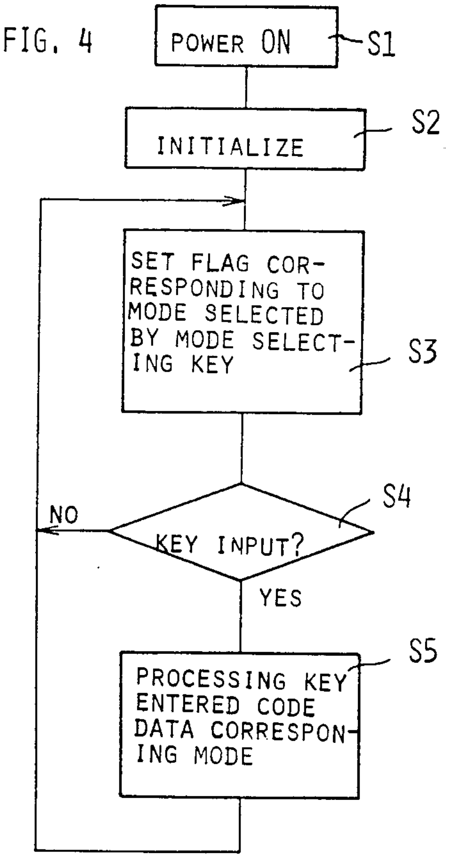
FIG. 4 is a flow chart depicting operation of the embodiment.

FIG. 4 shows a flow chart illustrating the operation of the electronic typewriter of the invention. A power source is turned on at step S1, and subsequently the initializing procedure is performed at step S2. Further a flag corresponding to the mode selected by mode selecting key 72 of of the three print modes, i.e. non-print mode, collection print mode and direct print mode, is set at step S3. Then, at step S4, determination is repeatedly made regarding whether or not the key input exists.

If the key input exists (i.e.YES) at step S5, processing is performed corresponding to various modes of key inputted code data. The processing at step S5 is described, for example, in U.S. patent application Ser. No. 479,810 filed Mar. 28, 1983, having the same assignee as hereof. These steps or procedures are not relevant to the invention and are omitted hereat for sake of clarity of description.

If a text memory switch 74 is turned on, a text memory 96 is ready for use. Text memory 96 may be used in any of the non-print mode, collection print mode and direct print mode. Text creation using text memory 96 is closely similar to ordinary typewriting. However, if data stored in the text memory is to be printed later and the printing operation is desired to be stopped at any position, a code key 66 and alphabetic key 20 of letter s are simultaneously operated at the position and the printing stop command data is stored in text memory 96.

Figure 5:
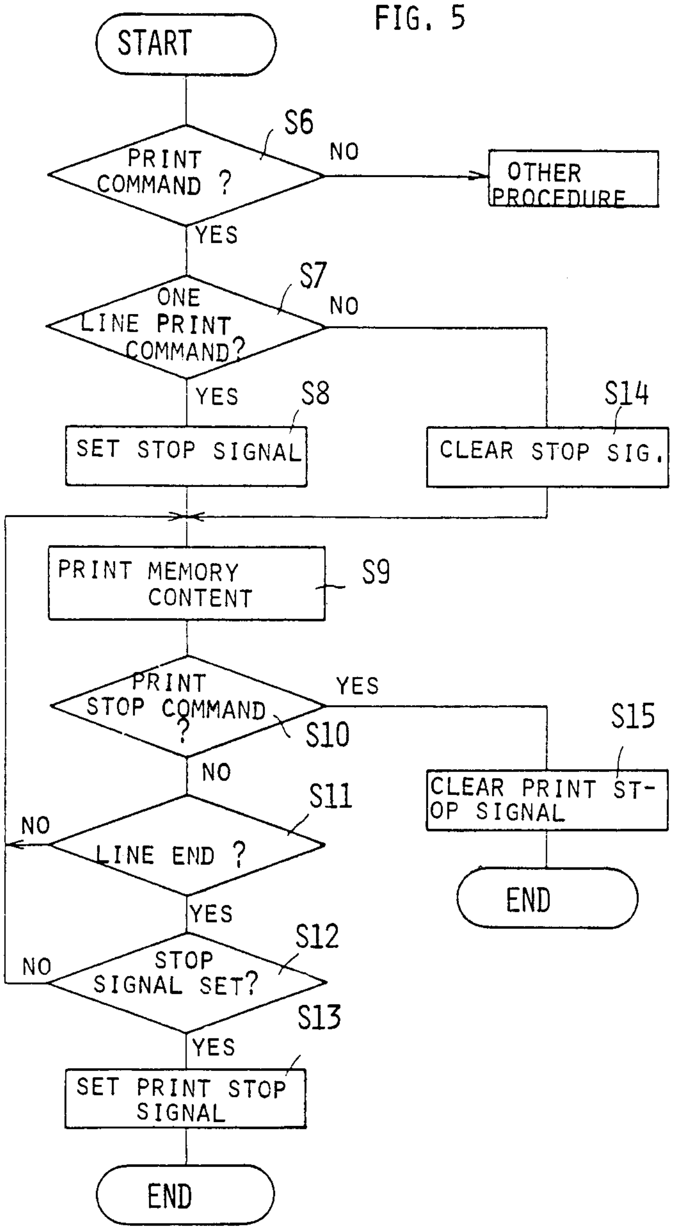
FIG. 5 is a flow chart depicting processing routines closely related to Step S5 of FIG. 4.

When the text created in the above manner is printed, i.e. when the printing unit of the typewriter is controlled according to the text data written within text memory 96, control is performed according to the flow chart of FIG. 5.

First, at step S6, determination is made whether or not the printing instruction is issued. The printing instruction may be issued by either of two methods. (1) Method of operating code key 66 and alphabetic key 20 of letter p simultaneously, or (2) method of operating code key 66 and continue key 68 simultaneously. The first (1) method instruction commands to perform the printing operation continuously to the position of the printing stop command data, if there is a command data in the text, or to the end of the text if there is no command data. This instruction shall be called the continuous printing instruction for convenience.

The second (2) method instruction commands to stop the printing operation every time the printing of one line is finished. This instruction shall be called one-line printing instruction.

As a result of the determination in step S6, if neither the continuous printing instruction nor the one-line printing instruction is issued (i.e. NO) the program execution is transferred to other procedures. If either instruction is issued (i.e. YES), at step S7 determination is made whether or not the instruction is one-line printing instruction. If it is a one line printing instruction, at step S8, the stop signal is set to third register 95 of RAM 88, and at step S9, the contents of text memory 96 are printed.

Every time one character is printed, at subsequent step S10, determination is made regarding whether or not the instruction is printing stop instruction. At step S11 determination is made whether or not the printing of one line is finished. If determination results at both steps S10 and S11 are NO, the program execution is returned to step S9 again and the content of the text memory 96 is further printed.

When the printing of one line is finished, determination made in step S11 is YES. Next at step S12, determination is made whether or not the stop signal is set to the third register 95. When the one line printing instruction is issued, the stop signal is set at step S8 and thus determination in step S12 is YES and the printing stop signal is set at step S13 and operation of the printing unit is stopped according to the printing stop signal.

Determination is made whether there is printing stop instruction at step S10 by viewing whether or not the read data is any of the printing stop command data and the text finishing data. Determination of whether the printing of one line is finished at step S11 is made by viewing whether or not the read data is carriage return data.

If determination in step S7 is NO, i.e. if the printing instruction is continuous printing instruction, the program execution is transferred to step S14 whereby the stop signal of third register 95 is cleared and subsequently steps S9, S10, S11 and S12 are executed. Since the stop signal is cleared at step S14, then the determination at step S12 is NO, and thus, even if the printing of one line is finished, the printing operation in the printing unit is not stopped but the program execution is returned to step S9. When such procedures are repeated and finally the read data becomes printing stop command data or text finishing data, determination made in step S10 is YES. Then, step S15 is executed whereby the printing stop signal is cleared and operation of the printing unit is stopped.

If the printing unit, stopped in the above manner, is to be operated again, continue key 68 is operated. Except for the case when the text comes to an end and thus the printing unit is stopped, operation of continue key 68 again starts processing according to the flow chart of FIG. 5. Thus, the contents of the text memory 96 are printed for every printing line or until the next printing stop command data of text finishing data appears.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A typewriter with text memory, comprising a printer for performing operation using a printing head supported for movement along printing lines of a printing paper held on a paper holding member;

a keyboard having a number of character keys, symbol keys and function keys arranged thereon;

a text memory for sequentially storing printing data and function data, entered from said keyboard;

said function keys including a code key, said code key being operated together with any one of said above character keys, function keys, and symbol keys so as to generate code data which is different from code data generated when said any one of said character keys and symbol keys is operated solely;

printing stop command data generating means for storing a printing stop command data in said text memory in response to said code key and one of said character keys being operated concurrently;

said function keys further including a continue key, said continue key operating to start printing operation again after printing operation is stopped according to said printing stop command data in said text memory;

first printing control means rendered operative in response to concurrent depressions of said code key and another character key, except said one of said character keys, for causing said printer to print data stored in said text memory from a prescribed position until said printing stop command data is detected; and second printing control means rendered operative in response to concurrent depressions of said code key and said continue key and including detecting means, for causing said printer to print data stored in said text memory until said detecting means detects a carriage return data in the text memory, and then to stop printing operation.

2. The typewriter of claim 1, further comprising means for detecting completion of printing of one line.

3. The typewriter of claim 2, wherein said detecting means detects a carraige return signal.

4. The typewriter of claim 1, further comprising a register means for storing operation of said second printing control means.

5. The typewriter of claim 1, wherein said printing stop signal is outputted by presence of printing stop command data in said text memory and text end data.

6. The typewriter of claim 1, further comprising means for clearing contents of said register and means for causing said printer to print remaining data of text, until a printing stop signal is detected.

7. The typewriter of claim 1, wherein said printing head of said printer is a thermal head.

* * * * *